F. PORSCHE.
POWER TRANSMISSION.
APPLICATION FILED FEB. 13, 1909.
925,504.
Patented June 22, 1909.
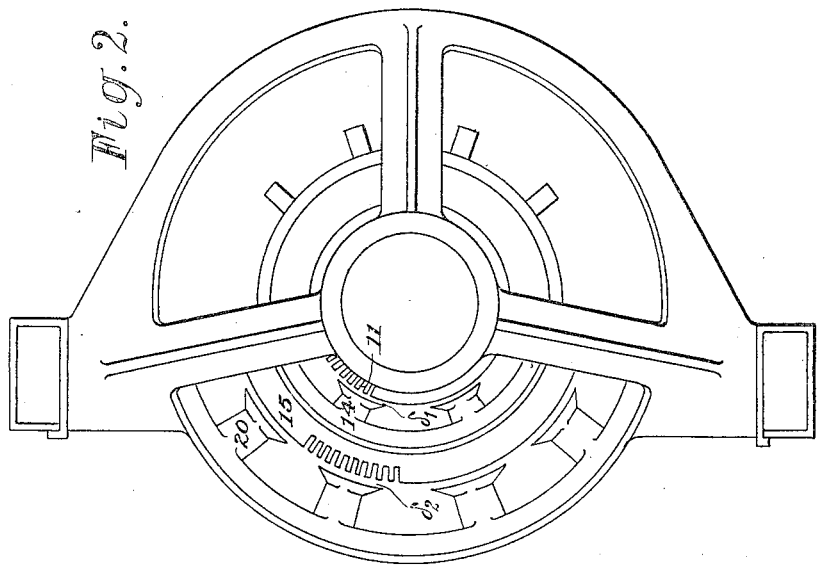
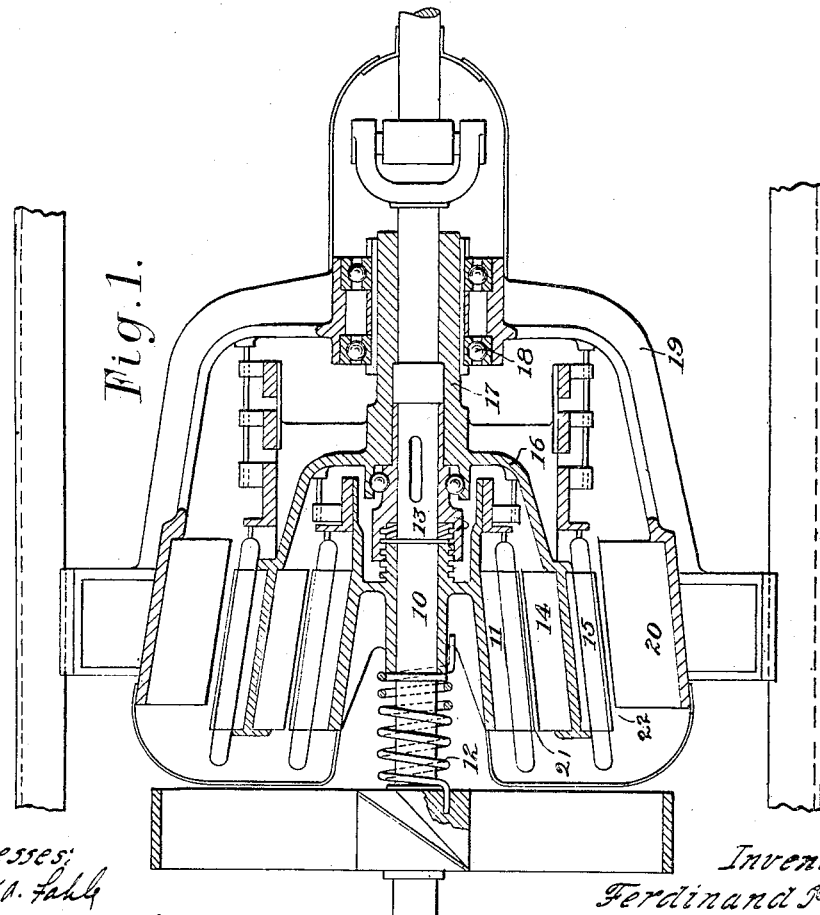
Witnesses:
Frank A. Fahl
Walter Troemel.
Inventor,
Ferdinand Porsche,
By Bradford & Hood
Attorneys.

UNITED STATES PATENT OFFICE.

FERDINAND PORSCHE, OF WIENER-NEUSTADT, AUSTRIA-HUNGARY.

POWER TRANSMISSION.

No. 925,504.        Specification of Letters Patent.        Patented June 22, 1909.

Application filed February 13, 1909. Serial No. 477,669.

*To all whom it may concern:*

Be it known that I, FERDINAND PORSCHE, engineer and acting manager of the Oesterreichische Daimler-Motoren-Gesellschaft of Wiener-Neustadt, a subject of the Emperor of Austria - Hungary, and a resident of Wiener-Neustadt, Lower Austria, in the Empire of Austria-Hungary, have invented Improvements in or Relating to Power Transmission; and I do hereby declare the following to be a full, clear, and exact description of the invention, such as will enable others skilled in the art to which it appertains to make and use the same.

This invention relates to a method of and apparatus for regulating the driving of spindles and the like on which variable traction efforts act in such manner that the power of the driving motor, after its maximum has been reached, should not be exceeded, but should remain invariable.

The method and the apparatus according to this invention are hereinafter described in their application to a motor vehicle.

The apparatus consists in a gear constituted by a suitable constructive connection of two electric armatures and two systems of magnets. This gear transmits the power of the driving engine or motor, for instance of a petrol engine, to the wheels of the vehicle.

At the circumference of each of the wheels of a motor vehicle, a constantly varying torque acts during driving, in accordance with the nature of the ground, gradients etc. As is well known, a petrol engine gives its greatest power and highest efficiency only with a given torque, and stops if the torque be increased only to a comparatively small extent. The solution of the problem, to maintain constant the torque or the power of the petrol engine in spite of the varying traction resistances acting at the circumference of the wheels, is therefore of great importance, and has led to the adoption of a change speed gear, adjustable by hand by means of a lever, or of means for an automatic regulation of the dynamo, in cars with electric transmission of power. In the latter case, the tractive force of the electric motors driving the wheels, is not effected direct by the automatic regulation. For that reason, it is necessary to have a switch lever by means of which, in case of great variations of load, the change of resistance in a controller is effected by hand, the strength of current and the number of revolutions of the electric motors being brought in accordance with the work of the petrol engine by the said change of resistance.

The object of this invention is to carry out the above mentioned regulation of electric transmission of force in a complete and, if desired, automatic manner. If the said regulation takes place automatically, then the above mentioned switch lever, and the manipulation required for moving it, become superfluous. The speed of the vehicle is at the same time regulated at will by adjusting the gas mixture and the ignition, as long as the petrol engine is not working at its full power. But when its maximum power is exceeded, the automatic regulation commences to operate. The vehicle will then have the highest speed possible in view of the resistances acting at the moment on the wheels, whereby the most favorable efficiency of the petrol engine is maintained. As electric transmissions of force have a very high efficiency, and as electric regulations have the property of adapting themselves instantaneously to the changes in the conditions of working, the power of the driving engine will be utilized in the best possible manner by a completely automatic regulation.

By using two electric systems, each of which consists of an armature and field magnets, the complete regulation in accordance with the invention is effected by one portion of one system being longitudinally shifted together with a portion of the other system in such manner that, owing to the beveled or conical surfaces at the armature and field magnets in the two systems, the air gap of one system is increased, and at the same time that of the other system is reduced, and in that way the magnetic field of one system is weakened, and at the same time that of the other system strengthened. The movement can be brought about by the action of a spring, whereby the method is carried out not only in a perfect, but also in an automatic manner.

The apparatus shown by way of example in Figs. 1 and 2 is based upon the automatic regulation.

On a spindle 10 connected to the crank shaft of the driving motor, for instance of a petrol engine, is mounted a current generating armature 11 in such manner that it can rotate on the spindle 10 but not move laterally on the same. The said armature is connected to the spindle of the petrol engine by a suitable helical spring 12. On the spindle 10 is further mounted a sleeve 13 which, owing to the key and feather coupling used, cannot rotate on the spindle, that is to say must rotate together with it, but can be moved longitudinally. The said sleeve is formed at one side into a nut engaging with a screw-thread cut on the extension of the hub of the dynamo armature 11.

The field magnets 14 of the dynamo armature 11 are directly connected to the armature 15 of the motor, for instance in such manner that they are concentrically superposed. They are all supported by a bracket or spider 16 to which are secured two contact rings as well as the brush holders of the armature 11. The said spider is connected to the spindle 17 (or is mounted on the same in such manner that it must rotate together with it, but can also move laterally on the same). The spindle 17 rotates in a ball bearing 18 built into the casing 19. The field magnets 20 of the armature 15 are secured to the fixed casing 19.

The surfaces of the two armatures and of the polar surfaces opposite them, are not cylindrical, but practically conical.

The operation is as follows: The spring 12 transmits the power of the petrol engine to the dynamo armature 11. In the winding of the latter is generated a current which is sent into the two magnet fields and into the second armature. In that way the armature 15 will rotate as a motor armature, and its power will be transmitted by the bracket 16 to the spindle 17, and from the same in a corresponding manner to the wheels. As the field magnets 14 of the dynamo armature are also connected to the same armature 15, the current generated in the former will depend on the difference in the numbers of revolutions of the two armatures. Owing to the mobility of the dynamo magnets, the power of the petrol engine is transmitted by the said magnets direct to the spider 16 and the spindle 17, so that the motor armature 15 has to supply to the spindle 17 only the remainder of the required tractive force. The conditions are calculated in such manner that the motor armature rotates more slowly than, and during forward driving in the same direction as, the dynamo armature. The spring 12 is of such strength that the resistance acting as the circumference of the wheels, can be increased to such an extent until they reach the value corresponding to the maximum power of the driving engine, without the said spring yielding during the transmission of the said power, that is to say, the dynamo armature is driven up to that limit in such manner that it does not turn relatively to the spindle 10.

If the resistance acting at the wheels is increased, for instance, by the increase of the gradient to be overcome by the vehicle, the strength of current received by the motor armature will also increase. The current which must be given off by the dynamo, also increases, and this would be equivalent to an increase of the torque to be supplied by the petrol engine, or to an increase of its power. At this increased strain the spring will, however, yield, that is to say, it will leave behind the armature 11 in the rotation. Up to that time the said armature rotated with the same speed as the sleeve 13. Now it will slightly lag relatively to the same, as the said sleeve rotates together with the spindle 10 directly connected to the petrol engine. In that way the sleeve 13, being connected to the dynamo armature by means of a screw thread, will be longitudinally moved in such manner that it will move away from the armature 11. In that way, the spider 16 will also move, and with it the motor armature 15 and the magnets 14 of the dynamo in the same direction, whereby, owing to the conicity or beveling of the armature and of the pole surfaces, the gap 21 between the dynamo armature and the opposite magnets will be increased, and at the same time the air gap 22 between the motor armature and the magnets built in the casing, will be reduced. Owing to the reduction of the air gap 22, the number of revolutions of the motor armature and therefore of the wheels, as well as the electrical power increased by the increased load, will be reduced. But the decrease of the air gap 22 will not be sufficient to cause the electrical power to sink to its original value, as the regulation extends also to the field of the dynamo. The said field will become smaller owing to the increase of the air gap 21 whereby the torque required for a given current will be reduced. The spider 16 will therefore move only to such an extent that the current in the motor armature will be so reduced that, having regard to the reduced field of the dynamo armature and the traction effort transmitted by the dynamo magnets, it will require the former torque in the driving engine. The current in the dynamo armature will also be affected by the regulation. Owing to the increase of the difference in the number of revolutions (due to the slower running of the motor) between the dynamo armature and its magnets 14, it would increase, but owing to the increase of the air gap 21, it is again correspondingly reduced in such manner that the driving motor is again working with the desired maximum power. Beginning at the moment at which the dynamo again requires only the traction effort which must not be exceeded, the spring 12 will stop turning, and drive the armature 11 without the latter again lagging behind.

If the resistance acting at the wheels is reduced to its original value, the spring will become unloaded by forcing the dynamo armature to run in advance of the spindle to a certain angle. In that case, the sleeve 13 together with the spider 16 will be screwed nearer to the dynamo armature. In that way the air gaps 21 and 22 will be altered in the opposite direction, the number of revolutions of the motor armature, and with it the speed of the vehicle will be increased. With automatic regulation of the speed of the vehicle, the power of the petrol engine will therefore be always maintained constant.

The joint longitudinal movement of each part of the two electrical systems need not, as already stated, be effected automatically, but can also be effected by hand by any desired well known means.

What I claim as my invention and desire to secure by Letters Patent is:

1. A power transmitter comprising a driving member, a driven member, and intermediate connections between said driving member and driven member comprising a pair of electrical systems each consisting of an armature and a coacting field relatively movable, and means for variably associating the armature and field of each of said two systems to vary the electrical interaction therebetween and thereby vary the driving effect of the driving member upon the driven member.

2. A power transmitter comprising a driving shaft, a driven shaft, an armature carried by one of said shafts, a coacting field carried by the other of said shafts, a second armature and a second coöperating field, one of said parts being carried by one of the shafts and the other of said parts carried by a suitable support, and means for relatively shifting each armature and its field to vary the electrical interaction therebetween, thereby varying the effect of the driving shaft upon the driven shaft.

3. A power transmitter comprising a driving shaft, a driven shaft, an armature carried by one of said shafts, a coacting field carried by the other of said shafts, a second armature and a coacting field, one of said last mentioned parts carried by one of said shafts, and means for varying the relation between each armature and its field to vary the electrical relation thereof and thereby vary the effect of the driving shaft upon the driven shaft.

4. A power transmitter comprising a driving shaft, a driven shaft, a conified armature carried by one of said shafts, a coacting conified field carried by the other of said shafts, a second conified armature and a coacting conified field, one of said last mentioned parts carried by one of said shafts, and means for varying the axial relation between each armature and its field to vary the electrical relation thereof and thereby vary the effect of the driving shaft upon the driven shaft.

5. A power transmitter comprising a driving shaft, a driven shaft, an armature carried by one of said shafts, a coacting field carried by the other of said shafts, a second armature and a coacting field, one of said last mentioned parts carried by one of said shafts, a spring forming a driving connection between the driving shaft and the member carried thereby, and intermediate connections between said member and the member carried by the driven shaft whereby relative rotative movement between the driven shaft and the member carried thereby will automatically vary the relation between each armature and its field.

6. A power transmitter comprising a driving shaft, a driven shaft, a conified armature carried by one of said shafts, a coacting conified field carried by the other of said shafts, a second conified armature and a coacting conified field, one of said last mentioned parts carried by one of said shafts, a spring forming a driving connection between the driving shaft and the member carried thereby, and intermediate connections between said member and the member carried by the driven shaft whereby relative rotative movement between the driven shaft and the member carried thereby will automatically vary the relation between each armature and its field.

7. A power transmitter comprising a driving shaft, an armature mounted thereon, a field coacting with said armature and carried by the driven shaft, a second armature also carried by said driven shaft, a coacting field for said second armature, and means for shifting the first field and second armature relative to their coacting parts to inversely vary the air gaps therebetween.

8. A power transmitter comprising a driving shaft, an armature rotatively mounted thereon, a spring forming a driving connection between said driving shaft and armature, a field coacting with said armature and carried by the driven shaft, a second armature also carried by said driven shaft, a coacting field for said second armature, and intermediate connections between the first armature and its coacting field and second armature for shifting said coacting field and second armature axially upon relative rotation of the first armature upon the driving shaft, thereby varying the air gaps inversely.

9. A power transmitter comprising a driving shaft, a driven shaft, a bracket splined upon the driven shaft, two armatures and two coacting fields, two of said four members mounted upon the driven shaft bracket, one of said four members rotatively mounted upon the driving shaft in position to electrically coöperate with one of the members carried by the driven shaft bracket, and the other one of said four members carried by a suitable support in position to electrically coöperate with the other of said members carried by the driven shaft bracket, a spring forming a driving connection between the driving shaft and the member rotatively mounted thereon, and intermediate connections between the member carried by the driving shaft and the members carried by the driven shaft whereby relative rotation between the driving shaft and the member journaled thereon will inversely vary the two air gaps.

10. A power transmitter comprising a driving shaft, a driven shaft, a bracket splined upon the driven shaft, two armatures and two coacting fields, two of said four members mounted upon the driven shaft bracket, one of said four members mounted upon the driving shaft in position to electrically coöperate with one of the members carried by the driven shaft bracket, and the other one of said four members carried by a suitable support in position to electrically coöperate with the other of said members carried by the driven shaft bracket, and means for axially shifting the driven shaft bracket to inversely vary the two air gaps.

11. A power transmitter comprising a driving shaft, an armature journaled thereon, a spring driving connection between said driving shaft and said armature, an axially movable bracket carried by the driven shaft, a field carried by said bracket and coacting with the armature, a second armature carried by said bracket, a second field coacting with said second armature, a nut splined upon the driving shaft and having a threaded engagement with the first armature and a rotative engagement with the bracket, whereby rotation of the first armature upon the driving shaft will cause an axial shifting of the bracket and vary inversely the air gaps between the two armatures and their fields.

12. A power transmitter comprising a driving shaft, a conified armature journaled thereon, a spring driving connection between said driving shaft and said armature, an axially movable bracket carried by the driven shaft, a conified field carried by said bracket and coacting with the armature, a second conified armature carried by said bracket, a second conified field coacting with said second armature, a nut splined upon the driving shaft and having a threaded engagement with the first armature and a rotative engagement with the bracket, whereby rotation of the first armature upon the driving shaft will cause an axial shifting of the bracket and vary inversely the air gaps between the two armatures and their fields.

13. A power transmitter comprising a driving shaft, a driven shaft, an armature carried by one of the shafts, a coacting field carried by the other of said shafts, a second armature and a second coacting field, one of said parts being carried by one of the shafts and the other of said parts carried by a suitable support, and means for relatively shifting one armature and its field to vary the electrical interaction therebetween, thereby varying the effect of the driving shaft upon the driven shaft.

In testimony whereof I have signed my name to this specification in the presence of two subscribing witnesses.

FERDINAND PORSCHE.

Witnesses:
 FRANZ REITER,
 AUGUST FUGGER.